(12) United States Patent
Flemin et al.

(10) Patent No.: US 9,038,960 B2
(45) Date of Patent: May 26, 2015

(54) ABSORBENT DOME FOR A RADIATING COLLECTOR TUBE

(75) Inventors: Christian Flemin, Dremil-Lafage (FR); Andrew Walker, Pechbusque (FR)

(73) Assignee: AIRBUS DEFENCE AND SPACE SAS, Les Mureaux (FR)

( * ) Notice: Subject to any disclaimer, the term of this patent is extended or adjusted under 35 U.S.C. 154(b) by 677 days.

(21) Appl. No.: 13/214,527

(22) Filed: Aug. 22, 2011

(65) Prior Publication Data

US 2012/0043427 A1 Feb. 23, 2012

(30) Foreign Application Priority Data

Aug. 20, 2010 (FR) ...................................... 10 03405

(51) Int. Cl.
*B64G 1/58* (2006.01)
*B64G 1/50* (2006.01)
(Continued)

(52) U.S. Cl.
CPC .. *B64G 1/50* (2013.01); *B64G 1/58* (2013.01); *B64G 1/503* (2013.01); *H01J 23/033* (2013.01); *H01J 25/34* (2013.01)

(58) Field of Classification Search
CPC .......... B64G 1/503; B64G 1/58; B64G 1/546; B64G 1/54
USPC ........... 244/168, 164, 171, 173, 171.8, 172.7; 136/272, 244, 246, 245
See application file for complete search history.

(56) References Cited

U.S. PATENT DOCUMENTS

| 3,817,320 A | 6/1974 | Williams |
| 4,098,956 A | 7/1978 | Blickensderfer et al. |
| 5,862,462 A | 1/1999 | Tyner et al. |

(Continued)

FOREIGN PATENT DOCUMENTS

| EP | 0 376 827 A1 | 7/1990 |
| EP | 0 831 513 A1 | 3/1998 |
| EP | 1 065 450 A2 | 1/2001 |

OTHER PUBLICATIONS

Lampert C. M.: "Coatings for Enhanced Photothermal Energy Collection", Solar Energy Materials, Solar Energy Materials, North-Holland Publishing Company, Amesterdam, NL, vol. 1 Jan. 1, 1979, pp. 319-341, XP000900880, ISSN: 0165-1633, DOI; DOI: 10. 1016/0165-1633 (79)90001-7 Cited in French Search Report.

(Continued)

*Primary Examiner* — Valentina Xavier
(74) *Attorney, Agent, or Firm* — Young & Thompson

(57) ABSTRACT

A device for thermal monitoring a piece of equipment, which is integrated on a craft placed in a forced vacuum environment, an outside part of the equipment projecting outside of a wall of the craft and being subjected to a solar radiation flux, includes an absorbent screen that is suitable for being placed between the outside part of the equipment and the wall of the craft, whereby this absorbent screen has—on at least one portion of its front face, designed to be placed on the side removed from the wall of the craft—an absorptivity $\alpha_{SOLAR}$ that is the largest possible in the field of solar radiation, coupled to a low emissivity $\epsilon_{IR}$ in the infrared spectrum. The absorbent screen is made of a very heat-conductive material and has—on at least a portion of its rear face, suitable for being oriented toward the wall of the craft—a high emissivity $\epsilon_{IR}$ in the infrared spectrum, typically greater than or equal to 0.7.

13 Claims, 4 Drawing Sheets

(51) Int. Cl.
*H01J 23/033* (2006.01)
*H01J 25/34* (2006.01)

(56) References Cited

U.S. PATENT DOCUMENTS

| | | | | |
|---|---|---|---|---|
| 6,073,887 | A | * | 6/2000 | Hosick ....................... 244/171.8 |
| 6,394,395 | B1 | * | 5/2002 | Poturalski et al. ......... 244/172.7 |
| 6,425,552 | B1 | * | 7/2002 | Lee et al. ........................ 244/97 |
| 6,921,050 | B2 | * | 7/2005 | Wehner et al. ................ 244/168 |
| 2004/0140402 | A1 | * | 7/2004 | Wehner et al. ................ 244/168 |
| 2005/0263647 | A1 | * | 12/2005 | Wehner et al. ................ 244/168 |
| 2005/0263648 | A1 | * | 12/2005 | Wehner et al. ................ 244/168 |

OTHER PUBLICATIONS

French Search Report, dated Apr. 14, 2011, from corresponding French application.

* cited by examiner

ABSORBENT DOME FOR A RADIATING COLLECTOR TUBE

The invention pertains to the field of thermal monitoring. It relates more particularly to the active thermal monitoring of equipment in a space environment, and its purpose in particular is application in the case of a telecommunications satellite stabilized in three axes and equipped with radiating collector traveling-wave tubes.

Context of the Invention and Problem Stated

It is known that one of the problems of on-board electronic-type payloads on satellites in a space environment is the dissipation of heat produced by said payload.

Actually, in the case of, for example, a telecommunications satellite, the payload often comprises traveling-wave tubes ("TOP" or "TWT" for Traveling-Wave Tube, in English), designed to amplify the signal to be transmitted with a very low background noise. These traveling-wave tubes, however, release a large amount of heat, which is to be dissipated into space to prevent a temperature rise of the payload, putting its proper operation in danger. The collector of these traveling-wave tubes with a radiating collector often operates at a temperature of approximately 200° C., whereas the tube itself is brought to several tens of degrees C. Purely by way of information, the heat released on a current telecommunications satellite reaches several kilowatts, and it is clear that thermal dissipation capacity is then a dimensioning element of the power of the payload.

The case of telecommunications satellites stabilized in attitude in three axes, i.e., pointing a fixed direction over time, is considered here. This is typically the case of geostationary satellites. It is thus conventional to define for these satellites so-called Earth and anti-Earth faces, oriented toward Earth or away from the latter, and east and west faces, perpendicular to this direction of Earth, and north and south faces, perpendicular to the axis of the Earth's poles, and therefore largely shielded from the sun by comparison with other faces of the satellite.

Hereinafter, the "hot" case is defined as the situation in which a radiating tube is subjected to solar radiation, whereas the radiating tube is in operation and therefore produces significant heat to be dissipated. In contrast, the "cold" case is defined as the case where the radiating collector is in the shadow of the satellite. It is understood that the temperature difference between these two cases is counted in tens of degrees.

As is known, the dissipation of heat in the space environment can be achieved only by radiation. Various devices for dissipating heat toward space have then been considered for the payloads of these stabilized satellites.

Among the latter, the patent document EP 0 376 827 (Thomson CSF 1988) describes a traveling-wave tube whose collector transmits its heat by conduction to a ribbed cooler located on the outer surface of the satellite.

Likewise, the patent document U.S. Pat. No. 5,862,462 (Space Systems/Loral 1996) describes a traveling-wave tube cooling system implementing radiating collectors toward space by means of a ribbed cooler.

This principle of the radiating collector tube (TCR), known in the art, is illustrated diagrammatically in FIG. 1. This figure demonstrates the zone 1 that is internal to the satellite, delimited in a simplified way by a floor 2 (which is actually a north or south face of the satellite) and a wall 3, which is oriented, for example, east or west relative to the sun. In this inside zone 1, the dissipation of heat is done primarily by conduction. In contrast, in the zone 4 that is external to the satellite, the dissipation of heat is done by radiation.

The satellite comprises a set of traveling-wave tubes 5 of the type that is known in the art. Each traveling-wave tube 5 comprises an input 10 of the signal to be amplified, an amplified signal output 11, as well as a collector 6, which passes through a wall 3 of the satellite and supports a ribbed radiator 7, arranged on the outside of the satellite. The ribs, typically eight in number, generally have the same length and are inscribed in a circle.

The role of the ribbed radiator 7 is to radiate approximately 60% of the heat produced by the traveling-wave tube out into space, which serves as a heat sink. The remainder of the heat, or approximately 40%, is dissipated in the wall supporting the tube (see FIG. 2).

In the opposite direction, the ribbed radiator 7 receives radiation emitted by the sun or another external radiation source, and transmits it by conduction to the collector 6 of the traveling-wave tube 5.

A multilayer insulating protection 9 envelops and insulates the satellite, reducing the input of solar radiation or radiation generated by the ribbed radiator in the satellite.

Such a device is called a radiating collector tube (in English, RCTWT for radiatively cooled traveling-wave tube). Such devices are conventionally installed on the edges that are close to the north and south faces, in such a way that the radiating collectors have a view factor toward space that is as large as possible (the solid angle under which the equipment can emit radiation without receiving reflected radiation) in a zone that is largely shielded from the sun. However, it is understood that when a series of these radiating collector tubes 5 are placed side by side, the ribbed radiators 7 of the tubes 5 located between other tubes see their zone of radiation into space masked by the ribbed radiators 7 that surround them, which reduces their effectiveness.

Likewise, because of the radiated power, the spacing between the ribbed coolers optionally has to be increased, which involves increasing the pitch between the traveling-wave tubes within the payload. It is desirable, however, for the sake of performances of the payload, to reduce the length of the wave guides between the receiving antennas and the traveling-wave tubes 5 as much as possible. It is therefore sometimes necessary to use tubes in the center of a face, which naturally reduces the cooling capacity of the radiating collector, particularly if it is a face other than north or south.

Regardless of the reasons for proximity of the tubes or tubes whose collectors are placed on a face exposed to solar radiation, some of the radiating collectors see, under the worst conditions, their temperature reach 220° C. Such a temperature is able to cause damage at the materials composing the collector, and, for example, at the head 12 of the collector ("potting" in English), which makes the ribs integral with the collector by means of an adhesive. At too high a temperature, the associated tube runs the risk of being destroyed. This problem of reducing the maximum temperature of radiating collectors is therefore critical.

It is understood that for this application of heat dissipation in the space environment, the above-mentioned devices are not effective enough, which leads to limitations in the power that can be dissipated. The solutions that are mentioned lead to serious accommodation constraints and impacts on RF performance and on the weight of the payload that can be considered. An increase of the lengths of the wave guides is actually necessary if all of the tubes are to be mounted on the east/west edges of the telecom communication module. The temperature of the radiators of the radiating collector tubes is critical in the hot case, and there is no adjustment parameter other than the pitch between the tubes, which is set at the beginning of the program.

OBJECTIVES OF THE INVENTION

This invention therefore has as its object to eliminate the above-mentioned drawbacks by proposing a new device for thermal monitoring of the payload of the satellite.

According to a second objective of the invention, the latter is inexpensive to implement.

PRESENTATION OF THE INVENTION

First of all, the purpose of the invention is a device for thermal monitoring for a piece of equipment, whereby said piece of equipment is integrated on a craft placed in a forced vacuum environment, an outside part of the piece of equipment projecting outside of a wall of the craft and being subjected to a radiation flux by an external source, with the device comprising:

First collection means of at least a portion of the radiation emitted by the external radiation source, whereby said collection means comprise an absorbent screen that is suitable for being placed between the outside part of the equipment and the wall of the craft, whereby this screen has—on at least one portion of its front face, designed to be placed on the side removed from the wall of the craft—an absorbent surface with the largest possible absorptivity $\alpha_{SOLAR}$ in the field of solar radiation, coupled with a low emissivity $\epsilon_{IR}$ in the infrared spectrum, At least a second emission surface with a high emissivity $\epsilon_{IR}$ in the infrared spectrum, radiating toward the outside of the craft but not toward the outside part of the equipment, Means for heat transport between the absorbent surface and the emission surfaces.

By way of simplification, in a particular case of use, a sensor placed around a piece of on-board equipment on a satellite receives solar radiation in the visible band, and a remote radiator evacuates this energy in the form of infrared radiation in such a way as to prevent the solar radiation that is received by the sensor from being reflected toward the equipment. In this way, this helps to reduce the temperature of the equipment.

In this configuration, it is permissible to use radiation emission means away from the absorbent screen, and therefore typically in a zone that is not subjected to external radiation or that does not support equipment that is sensitive to said radiation.

It is understood that the second emission surface radiates toward the outside of the craft either directly or indirectly after reflection on a coating (for example of the multilayer insulating coating "MLI" type) of the outside wall of the craft.

According to a preferred embodiment, the absorbent screen is made of a very heat-conductive material and on at least a portion of its rear face, suitable for being oriented toward the wall of the craft, it exhibits a high emissivity in the infrared spectrum, typically greater than or equal to 0.7.

It is understood that in this case, a portion of the heat that is received by the absorbent screen is re-emitted by its rear face.

More particularly in this case:

The heat transport means comprise a high-temperature fluid loop to which the absorbent screen is linked conductively at at least one evaporator, With said fluid loop itself being linked conductively to a high-temperature radiator that forms radiation emission means.

According to a first embodiment, the absorbent screen has an overall concave shape that can be placed around the external part of the equipment.

In this case, according to an advantageous implementation, the absorbent screen comprises a first surface that is essentially flat and able to be placed parallel to the wall of the satellite, equipped with two lateral flanges that are inclined according to an angle of approximately 20 to 50° relative to said first surface.

Alternatively, the absorbent screen comprises a flat surface, with the central part of said flat surface receiving an absorbent coating that has a high absorptivity for solar radiation, the edges of this surface receiving a highly emissive coating in the infrared domain.

According to a preferred embodiment, the absorbent screen comprises means for attachment and conductive insulation so as to place it essentially perpendicular to the primary axis of the outside part of the equipment.

In one embodiment that facilitates the assembly of the device later on a satellite in the course of integration, the absorbent screen consists of several parts that are suitable for being assembled around the outside part of the equipment when the latter is already installed on a craft.

In one advantageous variant, the absorbent screen is an absorbent, high-temperature multilayer insulating cover element that comprises a sheet of high absorptivity for solar radiation and low emissivity $\epsilon_{IR}$ in the infrared spectrum. This arrangement corresponds to an inexpensive implementation of the device.

From another standpoint, the object of the invention is a satellite, comprising at least one thermal monitoring device as disclosed above.

From yet another standpoint, the object of the invention is a process for the thermal layout of a satellite as disclosed, comprising a stage for installation of at least one absorbent screen on the outside part of at least one piece of equipment, according to their maximum estimated temperature or measured during a test.

From yet another standpoint, the object of the invention is a process for the thermal layout of a satellite as disclosed, comprising a stage for installation of at least one absorbent screen on at least one radiating collector tube radiator, according to their maximum estimated temperature.

In this case, preferably, the process comprises a stage for installation of at least one absorbent screen on at least one tube radiator placed at the center of the east or west faces or on at least one radiator placed between other radiators.

BRIEF DESCRIPTION OF THE FIGURES

The objects and advantages of the invention will be better understood from reading the description and drawings of a particular embodiment, provided by way of nonlimiting example, and for which the drawings represent.

DETAILED DESCRIPTION OF AN EMBODIMENT OF THE INVENTION

The invention is designed to be used in particular within the framework of a space craft, in this example, which is in no way limiting, a satellite in orbit around the Earth. A telecommunications satellite in geostationary orbit stabilized in three axes is considered here. It remains clear, however, that the invention is also applied to any other type of support placed in the vacuum and designed to dissipate its heat purely by radiation.

Hereinafter, the term of infrared spectrum is defined by the band of wavelengths of between approximately 780 nm and 100 µm, and the solar spectrum by the band of between 10 and 780 nm.

Figure 1:
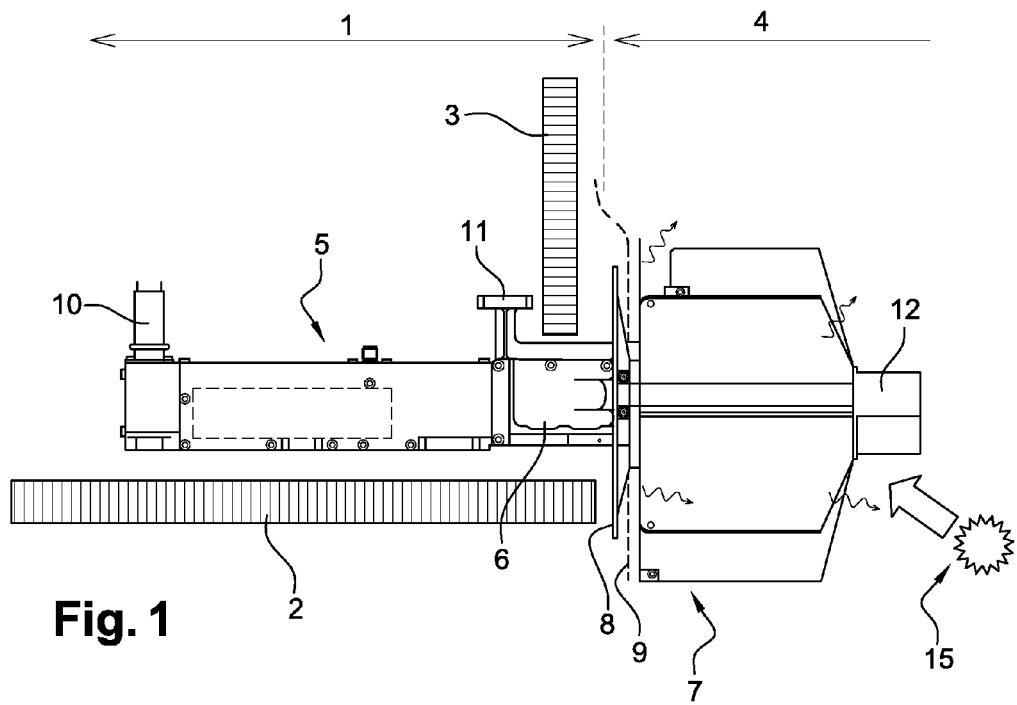
FIG. 1 (already cited): a schematic diagram of a radiating collector tube, in a side view, FIG. 2 (already cited): a schematic diagram of the modes for dissipation of the heat generated by a radiating collector tube.
Figure 2:
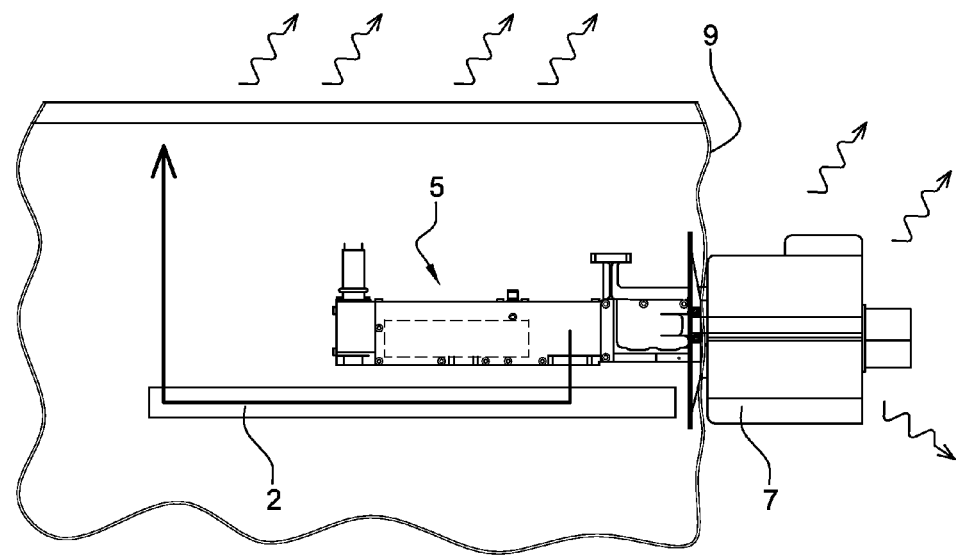

The invention is described here in an application with a radiating collector tube (radiative tube) as described above with reference to FIGS. 1 and 2, equipped with a radiator that is external to the satellite and arranged within the satellite in such a way as to determine a free space of at least several millimeters of thickness between the edge of the radiator that is the closest to the wall 3 of the satellite, and the multilayer insulation cover 9. It applies more broadly, however, to any equipment of which one part projects outside of a satellite or vehicle placed in a forced vacuum environment and undergoing reheating by radiation emitted by an outside source 15, the sun in this example.

Figure 4:
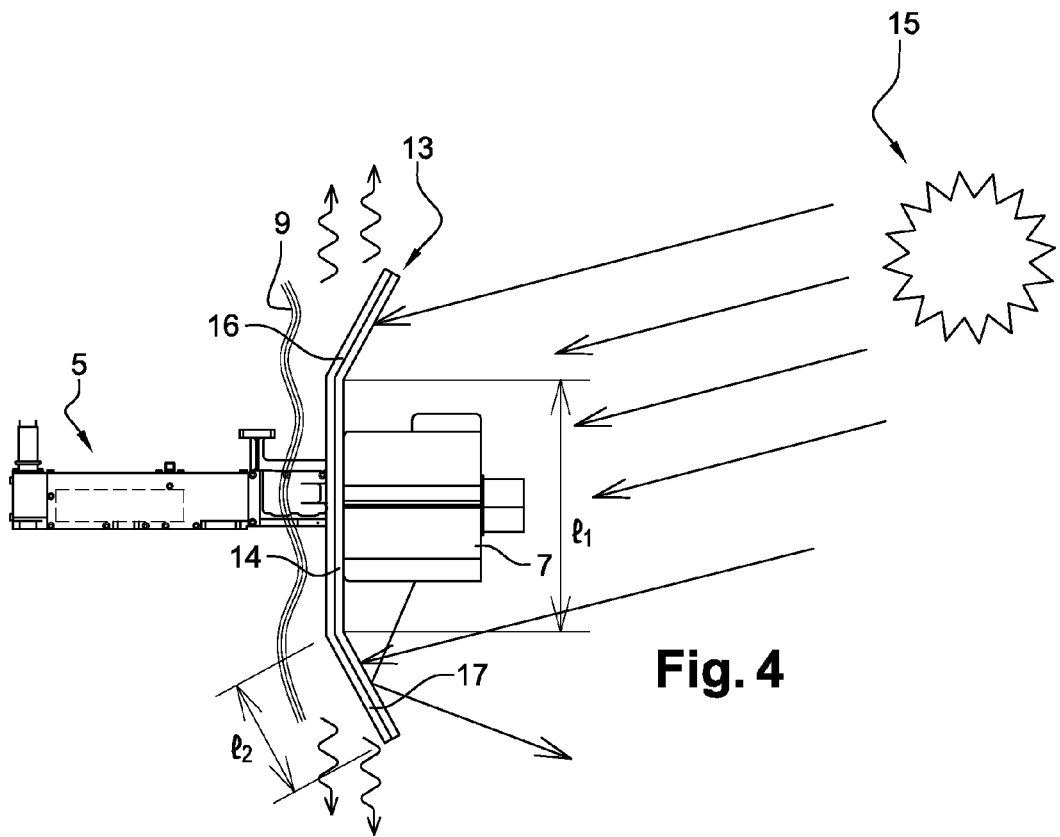
FIG. 4: a diagram that is analogous to FIG. 3, when an absorbent dome is installed around the radiator.

As illustrated in FIG. 4 in a particular implementation, the thermal monitoring device comprises an absorbent screen 13, inserted between one or more ribbed radiators 7 of radiating collectors and the multilayer insulating protection 9. It is understood that this absorbent screen is located behind the ribbed radiators 7, with respect to space. In this way, it does not disturb the radiation emitted by the ribbed radiator 7 of the collector that radiates toward space. In contrast, it considerably reduces the view factor of the multilayer insulating protection 9 by the ribbed radiator 7 of the radiating collector, thereby reducing the radiation that can be emitted by the ribbed radiator 7 toward said protection 9.

In the implementation that is in no way limiting illustrated in FIG. 4, the absorbent screen has an overall concave shape around the ribbed radiator 7 of the radiating collector 6. The absorbent screen 13 comprises, in this example, a first rectangular surface 14 that is essentially flat and parallel to the wall 3 of the satellite, equipped with two lateral flanges 16, 17 that are inclined according to an angle of approximately 30 to 45° relative to said first surface 14.

The first surface 14 comprises a recess (not visible in FIG. 4) at the axis of the radiating collector for allowing the latter to pass through. In this example, this recess is rectangular in shape and has dimensions that are a bit larger than those of the radiating collector 6. It is understood that the radiating collector 6 is not in direct contact with the absorbent screen 13 as described, for preventing thermal conduction between them.

The width l1 of the first surface 14 is larger than the span of the ribs of the radiator 7, here approximately forty centimeters, for a length that depends on the number of radiating collectors covered by the device. Purely by way of indication, the length of the first surface can thus be on the order of 120 centimeters if the absorbent screen 13 is to be placed behind five radiating collectors.

The width l2 of the lateral flanges is here on the order of ten centimeters, with a length that is equal to that of the first surface 14 of the absorbent screen 13.

In one variant (not illustrated) for which the absorbent screen 13 surrounds a single radiating collector 7, the screen comprises a first disk-shaped surface 14, surrounded by a tapered inclined edge 16.

The absorbent screen 13 is made of a light, very heat-conductive material, suitable for supporting a temperature of more than 200° C. In this example, it is made of aluminum, according to a technique that is known to one skilled in the art. In one variant embodiment, the absorbent screen 13 is made of composite material with high conductivity.

So as to facilitate its installation around one or more ribbed radiators 7 of radiating collectors, the absorbent screen 13 is made here of two essentially symmetrical parts, assembled in place by, for example, screwing or another known technique.

The front face of the absorbent screen 13 (ribbed radiator side 7) receives, in this example, an absorptive coating made of polished nickel in such a way as to impart to it a high absorptivity for solar radiation, typically $\alpha_{SOLAR}=0.9$, coupled to a low emissivity in the infrared, $\epsilon_{IR}=0.06$.

The rear face of the absorbent screen 13 (multilayer insulating cover side "MLI") receives, in this example, a highly emissive coating, for example of the type that is known under the commercial name Kepla coat (registered trademark), which is a black coating with plasma oxidation.

This highly emissive coating is characterized here by the following values:

Solar emissivity $\alpha_{SOLAR}=0.9$,

Emissivity $\epsilon_{IR}$ in the infrared domain approximately equal to 0.8.

It is clear that in this implementation, the absorbent screen 13 is designed to be placed in orbit with the satellite and is therefore to be compatible with the space environment. Its mechanical and geometric characteristics are therefore suitable for taking into account stresses at launch and during the space flight: behavior during degassing, thermal cycling, electrostatic charges, UV irradiations, aerothermal flux at launch, mechanical stresses at launch and in flight (particles). The absorbent screen 13 is made integral with walls 2, 3 of the satellite by means that are known in the art by complying with a thermal decoupling between the absorbent screen 13 and the satellite, and the device comprises a grounding of this absorbent screen 13.

Operating Mode

The absorbent screen 13 is installed around a certain number of radiators 7 of radiating collector tubes 5 according to their maximum temperature, for example as calculated during the design phase or observed during simulation tests. In particular, this absorbent screen 13 typically can be installed on the radiators 7 of tubes 5 placed at the center of the east or west faces, or on radiators located between other radiators and thereby having a smaller solid angle of radiation. It is clear that the shape and the surface of the absorbent screen 13 may be suitable for specific environmental conditions of each tube, which provides a greater flexibility in the layout.

Figure 3:
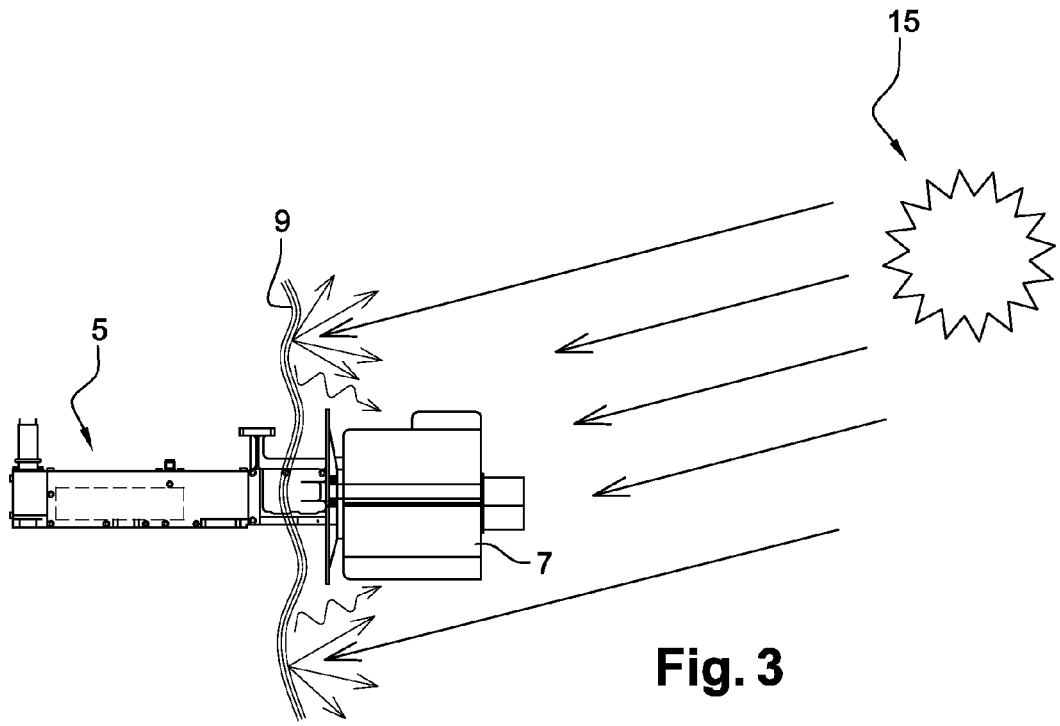
FIG. 3: a diagram that explains the influence of solar radiation on the temperature of the radiator of a radiating collector tube, in the absence of a device as described by way of example of implementation of the invention.

The operating mode is assessed by comparison with FIG. 3 that illustrates the situation in the absence of a device according to the invention. In the prior situation, the solar rays are reflected on the surface of the multilayer insulating protection 9 of the satellite, and a portion of this radiation is re-emitted to the ribbed radiator 7 of a radiating collector 6. In addition, a portion of the heating of the protection also contributes to heating said ribbed radiator 7 even more. Under these conditions, the ribbed radiator 7 of the radiating collector 6 undergoes significant heating, which can cause it to exceed its qualification temperature.

Actually, it was noted that for an imaginary radiator 7 to emit 40 watts of heat originating from the radiating collector 6 into space, more than 20 additional watts were received originating from the external environment: multilayer protection, other radiators, direct solar radiation. That is to say that one third of the heat radiated by the radiator is due to fluxes originating from the external environment. Such a situation can bring the radiator to operate 60° C. above its theoretical operating temperature, typically at 220° C. instead of 160° C. in the absence of external fluxes.

In contrast, when a thermal monitoring device as described above is installed around a radiating collector, the front face of the absorbent screen 13, rotated toward the ribbed radiator 7, absorbs the largest portion of the incident solar radiation, which is then no longer reflected because of the strong absorptivity nor re-emitted because of the low emissivity of this face in the infrared to the radiator 7. The absorbed heat is transmitted by the absorbent screen, made of highly conductive material, toward its rear face. The latter is highly emissive in the infrared and consequently re-emits the heat from the absorbent screen 13 to the multilayer insulating protection 9 and into space. In this manner, the contribution of the solar radiation to heating the radiator 7 is considerably reduced, as well as the contribution of infrared radiation coming from the wall of the craft.

In addition, the front face of the absorbent screen, with low infrared emissivity, reflects the infrared radiation emitted by the ribbed radiator 7, which maximizes the energy radiated into space.

Advantages of the Invention

In the so-called "hot" case, i.e., when the radiating collector tube is operating, the reduction of temperature of the radiator that is obtained by using a device as described was estimated between 10° C. and 20° C. according to the position of the tube within the satellite and the external configuration around the tube.

In this hot case, the device according to the invention therefore makes it possible to reduce the temperature of the radiator 7 of the radiating collector tubes (external part at the radiating collector 6), which is a critical element. It makes it possible to keep the temperature of the ribbed radiator 7 at an acceptable level according to the configurations.

This makes possible a greater flexibility at the accommodation of these tubes on a satellite and a better optimization of the payload. The result is actually a broadening of mounting possibilities of radiating collector tubes on a telecommunications satellite, and a possibility of optimizing the wave guide lengths.

The internal and external layout of the payload is therefore facilitated, because the invention can be applied locally on one or more tubes as an additional adjustment parameter.

In summary, the advantages of the heat dissipation device according to the invention are:
  A simplicity of adjustment of the temperature of a radiating tube (existing technology and piece),
  A capability of carrying out this adjustment locally and later during the program, if necessary,
  An unmodified mechanical integrity of the traveling-wave tube,
  A reduction of the thermal stress of said tube,
  A low cost of use,
  An impact on the measured weight,
  A possibility of reducing the pitch (spacing) between tubes, because of their lower operating temperature.

Variants of the Invention

The scope of this invention is not limited to the details of embodiments considered above by way of example, but on the contrary it extends to modifications within the scope of one skilled in the art.

Application is possible to all of the types of radiating collector tubes comprising means for attaching a radiative decoupling screen by adapting to their specific geometry or dimensions.

In one variant of use, the highly emissive coating of the rear face of the absorbent screen 13 is a coating of the "white ceramic with plasma oxidation" type. This coating is designed for high temperatures of up to +450° C., which is broadly compatible with the maximum temperature of the radiator. The thickness of the coating is on the order of 100 µm.

Its thermo-optical characteristics are: a start-of-life solar absorptivity that is close to 0.26/end-of-life solar absorptivity that is less than approximately 0.55, and an emissivity $\epsilon$ in infrared that is close to 0.83.

In another variant, the rear face of the absorbent screen 13 (side removed from the wall of the craft) receives a highly emissive, sulfuric anodization-type coating.

This coating is characterized by the following values:
  Start-of-life solar absorptivity $\alpha_{SOLAR}=0.45$/end-of-life solar absorptivity $\alpha_{SOLAR}=0.7$,
  Emissivity $\epsilon_{IR}$ in the infrared domain that is approximately equal to 0.8.

Figure 5:
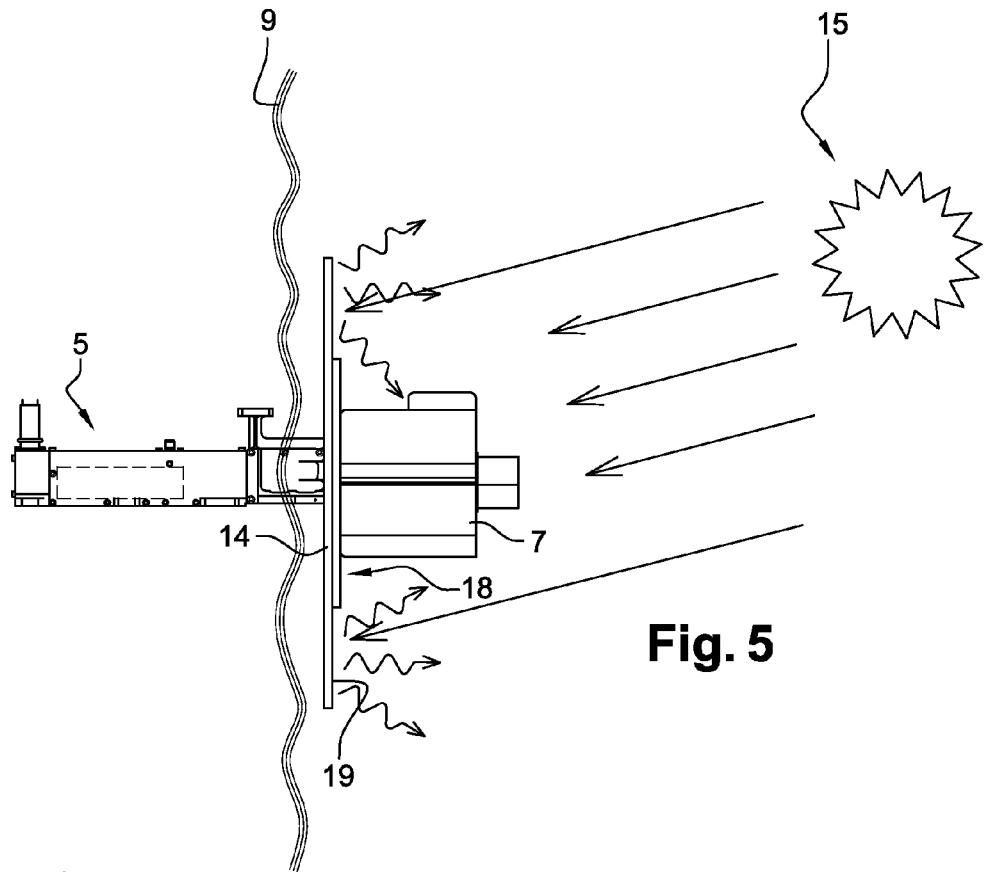
FIG. 5: an illustration of a first variant of implementation of the invention.

In one variant of absorbent screen form 13 illustrated by FIG. 5, the latter does not comprise lateral flanges 16, 17, but only a flat surface 14. In this variant, only the central part 18 of said flat surface 14 receives a coating that has a strong absorptivity for solar radiation, for example polished nickel. The edges 19 of this flat surface 14 (the farthest part from the radiator 7) then receive a coating that is identical to the one of the rear face, i.e., highly emissive, for example made of a Kepla coat-type material (registered trademark).

This arrangement makes it possible to transfer remotely the heat that is received from the sun just around the radiating collector before re-emitting it into space.

This variant of use offers the advantage of reducing the bulk of the device.

Figure 6:
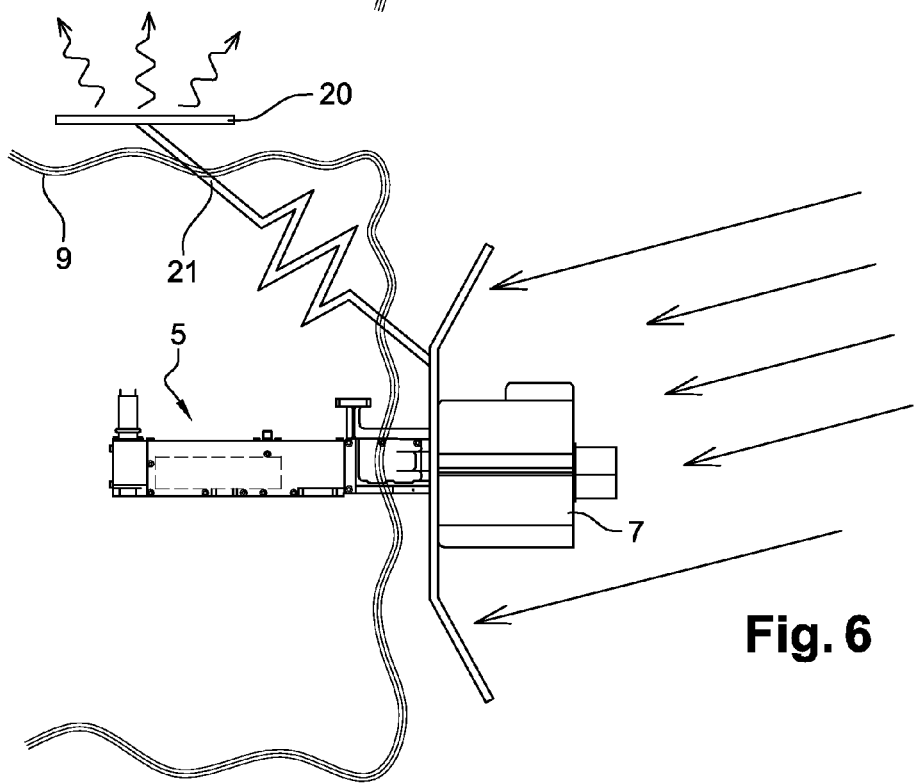
FIG. 6: an illustration of a second variant of implementation of the invention, using a fluid loop and an offset radiator.

In another variant of use, illustrated by FIG. 6, the absorbent screen 13 is conductively linked to a high-temperature fluid loop 21 at at least one evaporator (not shown in the figure), flattened against the rear face of the absorbent screen 13. Each evaporator is connected conductively to the absorbent screen 13 by means of a highly conductive seal and an interface piece.

The highly conductive seal, shaped, for example, like a sheet or thin rectangular plate, is of the type that consists of virtually pure graphite and is typically available under the trade name of Sigraflex seal (registered trademark).

The interface piece is flattened mechanically against the conductive seal in a series of attachment points in such a way as to ensure the best conduction possible between the absorbent screen 13 and the interface piece. This interface piece is made here of metal material, for example aluminum.

It supports the evaporator, placed essentially along its longitudinal axis. This evaporator is of the type that is known in the art.

Each fluid loop LHP (preferably two in number by way of redundancy) is also coupled conductively to a high-temperature radiator 20 that is offset some distance away or on another face of the satellite, by means that are known in the art.

Offset in the satellite is defined by the fact that the high-temperature radiator 20 can be placed at several tens of centimeters from the evaporator if necessary, according to the layout constraints of the faces of the satellite and by preferably installing, however, the high-temperature radiator 20 on a face that is not subjected to solar radiation.

In this variant, the absorbent screen 13 comprises, as in the description given above, an absorbent coating that is suitable for absorbing the solar radiation on its front face. In contrast, it does not comprise a particular coating on its rear face, with the highly emissive zone being offset at the high-temperature radiator 20.

The tube of the fluid loop is advantageously placed in coil form on the high-temperature radiator 20 to homogenize the temperature of said radiator.

The high-temperature radiator has, for example, an emissivity in the infrared range that is greater than 0.82, a start-of-life solar absorptivity that is less than 0.2, and an end-of-life solar absorptivity that is less than 0.27. It can comprise, for example, a Kepla coat-type coating (registered trademark), already mentioned, or any other highly emissive coating in the infrared range.

The unit that is formed by the absorbent dome 13, the fluid loop, and the high-temperature radiator is dimensioned according to conventional rules that are well known to one skilled in the art.

A thermistor, not illustrated in the figures, is installed on the ribbed radiator 7 in such a way as to monitor its temperature over time.

The device also comprises a connector (not illustrated in the figures) that is suitable for the activation of the high-temperature fluid loop as well as associated control means (also not illustrated).

These control means typically assume the form of a processor that is equipped with a memory supporting software for controlling the fluid loop, according to environmental data received by environmental sensors, in particular: solar flux received, temperature of the ribbed radiator 7.

Figure 7:
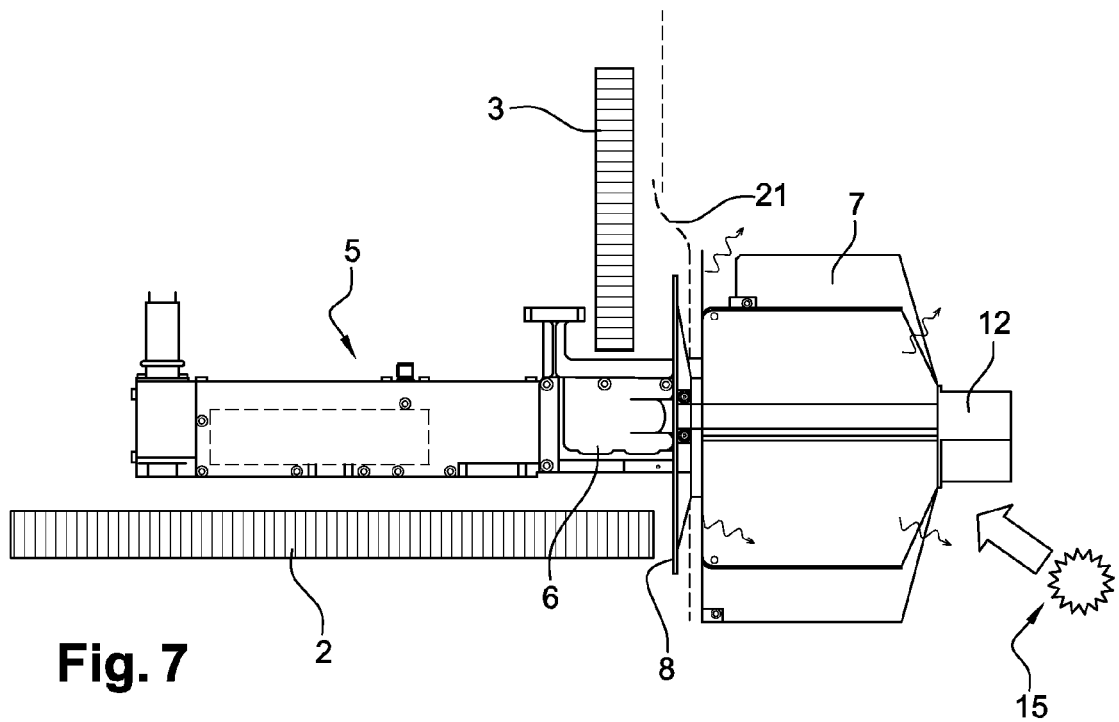
FIG. 7: an illustration of another variant of the implementation of the invention, using a specific and absorbent multilayer insulating cover.
Figure 8:
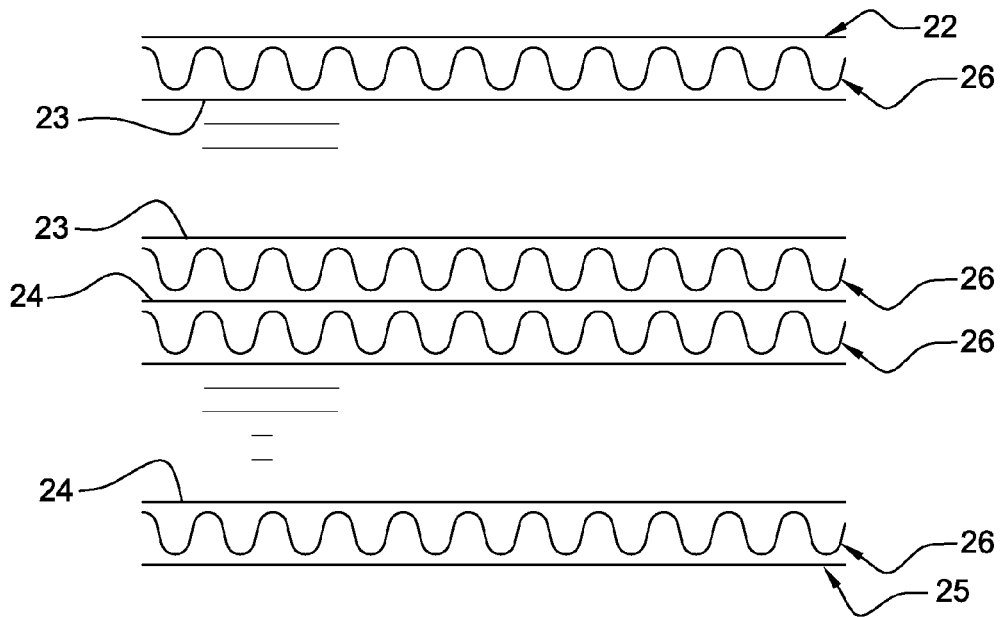
FIG. 8: a diagrammatic cross-section of a high-temperature multilayer insulating cover, as used in the variant of FIG. 7.

In yet another variant of use (see FIG. 7), the insulating dome, cited in the description above, is replaced by an absorbent, high-temperature multilayer insulating cover element (MLI), as is illustrated by, for example, FIG. 8.

As can be seen, such an absorbent multilayer insulating cover 21, known in the art, typically comprises—from the outside to the inside (or from top to bottom in FIG. 8)—a titanium sheet 22 of approximately fifteen microns of thickness, approximately four sheets of aluminum 23 of approximately twelve μm of thickness, approximately ten sheets of Kapton (registered trademark) 24 with an approximate thickness of 7.5 μm, aluminized on a face, and a Kapton sheet (registered trademark) 25 of approximately twenty-five μm, aluminized on one face, whereby these different sheets are separated by approximately fifteen thin layers 26 of glass fabric called Tissuglas (registered trademark) that has a thickness of several tens of μm.

This absorbent, high-temperature, multilayer insulating cover 21 locally replaces the multilayer insulating cover 9 over a width of approximately 600 mm in the vicinity of the radiating collector. It has an overall flat shape. The titanium sheet is positioned on the outer side, i.e., for the purpose of the radiating collector radiator 6.

In this example of use, the cover 21 is attached to the body of the satellite by a set of pins (not illustrated, FIG. 7), for example made of titanium, and of a type that is known in the art.

It is understood that during operation, the temperature of the external titanium sheet heats up and attains equilibrium based on the absorbed solar flux and radiative couplings with space and the external environment of the satellite. This titanium sheet therefore ensures the function of solar absorber (using its strong solar absorptivity) and a radiative decoupling with the radiator of the radiating collector tube (because of its low IR emissivity). The heat that is absorbed by the external sheet of the multilayer insulating cover MLI is partially transmitted to the wall of the craft through different layers that constitute the multilayer insulating cover MLI by conductive and radiative exchanges between the layers: this transmitted heat is then redistributed in a uniform manner by radiation or by conduction to the inside parts of the craft that are not critical in temperature or to an external radiator that is offset via heat pipes or fluid loops.

The approach with a "bare" titanium sheet acts as a solar absorber with weak thermal performance but that may suffice, depending on the need, i.e., to make it possible to achieve cooling of the radiator of the radiating collector tube on the order of 2° C. at several degrees Celsius according to the age of the satellite and its external configuration.

According to the thermal specifications, it is permissible to improve the concept disclosed above by depositing on this titanium sheet a better-performing absorbent coating of the type:

Brilliant Ni/black Ni: start-of-life and end-of-life solar absorptivity α=0.9 and emissivity ϵ=0.06

NiCr/SiO: start-of life and end-of-life solar absorptivity α=0.7 and emissivity ϵ=0.045

Brilliant Cr/black Cr: start-of-life and end-of-life solar absorptivity α=0.95 and emissivity ϵ=0.15.

The first two approaches make it possible to reach a cooling of the radiator of the radiating collector tube that can go up to approximately ten degrees Celsius.

The coatings above can also be used in other examples of the invention.

This variant makes it possible here as well not to require modification of the integrity of the radiating collector tube. Furthermore, it makes it possible to obtain an additional very low weight to take on board the satellite while being of a particularly simple implementation.

This variant does not create concealment of the field of view of the radiator of the radiating collector tube because of the overall flat shape of the absorbent, high-temperature, multilayer insulating cover 21.

It does not have an impact on the external geometry of the satellite.

It is understood that the size of the absorbent high-temperature, multilayer insulating cover element 21 can be adapted according to the number of radiating collector tubes to be equipped and the thermal specifications.

Finally, this variant constitutes a local adjustment means of the temperature of one or more radiating collector tubes during or at the end of development of a satellite program.

In the entire description, the case of radiating collector tubes, whose collector comprises a radiator that is external to the satellite and designed to dissipate the heat that is emitted by the tube, was used by way of example.

It remains clear that the device, as it was disclosed above, is more generally adaptable to any equipment comprising a part that is external to the satellite, therefore subjected to solar radiation and having to be cooled or kept at a predetermined temperature, for example antenna, optical sensor, . . . .

In particular, the device as described can be used for nozzles to the extent that when they are no longer in operation, their temperature is to remain below a maximum value, in particular for preventing the evaporation of fuel that is present in their feed pipe. In this case, an insulating dome protection, as disclosed above, placed essentially at the neck of the nozzle makes it possible to prevent the reheating of said nozzle by radiation reflected by the wall of the satellite, and therefore helps to cool the latter.

It is understood that here again, the object is to increase the view factor toward space, i.e., the solid angle under which the equipment can emit radiation without receiving reflected radiation.

It should be noted that, in the case of a nozzle, when the latter is operating, the insulating dome is also used as insulating material for the wall of the satellite relative to the heat that is emitted by said nozzle.

The invention claimed is:

1. A device for thermal monitoring for a piece of equipment, whereby said piece of equipment is integrated on a craft placed in a forced vacuum environment, an outside part of the equipment projecting outside of a wall of the craft and being subjected to a radiation flux by an external source,
    characterized in that the device comprises:
        first collection means of at least a portion of the radiation emitted by the external radiation source, whereby said collection means comprise an absorbent screen that is suitable for being placed between the outside part of the equipment and the wall of the craft, whereby this screen
        has—on at least one portion of its front face, designed to be placed on the side removed from the wall of the craft—an absorbent surface with an absorptivity $\alpha_{SOLAR}$ in the field of solar radiation that is greater than or equal to 0.7, linked to an emissivity $\epsilon_{IR}$ in the infrared spectrum that is less than or equal to 0.2,
        at least one emission surface with an emissivity $\epsilon_{IR}$ in the infrared spectrum that is greater than or equal to 0.7, radiating toward the outside of the craft but not toward the outside part of the equipment,
        means for heat transport between the absorbent surface and the emission surfaces.

2. The according to claim 1, wherein the absorbent screen is made of a heat-conductive material and has—on at least one part of its rear face, suitable for being oriented to the wall of the craft—a high emissivity $\epsilon_{IR}$ in the infrared spectrum greater than or equal to 0.7.

3. The according to claim 1, wherein:
    the heat transport means comprise a fluid loop to which the absorbent screen is linked conductively at at least one evaporator,
    said fluid loop is itself linked conductively to a high-temperature radiator that forms radiation emission means.

4. The according to claim 1, wherein the absorbent screen has an overall concave shape configured to be placed around the outside part of the equipment.

5. The according to claim 4, wherein the absorbent screen comprises a first surface that is essentially flat and able to be placed parallel to the wall of the craft, equipped with two lateral flanges that are inclined according to an angle of approximately 20 to 50° relative to said first surface.

6. The according to claim 1, wherein the absorbent screen comprises a flat surface, the central part of said flat surface receiving an absorptive coating that has an absorptivity for solar radiation greater than or equal to 0.7 and emissivity $\epsilon_{IR}$ in the infrared spectrum lower than or equal to 0.2, whereby the edges of this surface receive a highly emissive coating in the infrared domain.

7. The according to claim 1, wherein the absorbent screen comprises means for attachment and conductive insulation so as to place it in an essentially perpendicular way to the primary axis of the outside part of the equipment.

8. The according to claim 1, wherein the absorbent screen consists of several parts that are suitable for being assembled around the outside part of the equipment when the latter is already installed on a craft.

9. The according to claim 1, wherein the absorbent screen is an absorbent, high-temperature multilayer insulating cover element that comprises a sheet with an absorptivity for solar radiation greater than or equal to 0.7 and an emissivity $\epsilon_{IR}$ in the infrared spectrum lower than or equal to 0.2.

10. A satellite comprising at least one thermal monitoring device according to claim 1.

11. A process for thermal layout of a satellite according to claim 10, comprising a stage for installation of the absorbent screen on at least one outside part of a piece of equipment, according to their maximum temperature that is estimated or measured during a test.

12. The according to claim 2, wherein:
    The heat transport means comprise a fluid loop to which the absorbent screen is linked conductively at at least one evaporator,
    said fluid loop is itself linked conductively to a high-temperature radiator that forms radiation emission means.

13. The according to claim 2, wherein the absorbent screen has an overall concave shape that can be placed around the outside part of the equipment.

* * * * *